US005302953A

United States Patent [19]

Pierre et al.

[11] Patent Number: 5,302,953

[45] Date of Patent: Apr. 12, 1994

[54] SECONDARY RADAR ANTENNA OPERATING IN S MODE

[75] Inventors: Maryse Pierre, Gif s/Yvette; Michel Niboyet, Antony, both of France

[73] Assignee: Thomson-CSF, Puteaux, France

[21] Appl. No.: 85,057

[22] Filed: Jul. 2, 1993

[30] Foreign Application Priority Data

Jul. 3, 1992 [FR] France ................................ 92 08210

[51] Int. Cl.[5] ................................ G01S 13/76

[52] U.S. Cl. ................................ 342/37; 342/39; 342/372; 342/158

[58] Field of Search .................. 342/37, 32, 372, 373, 342/376, 377, 39, 158

[56] References Cited

U.S. PATENT DOCUMENTS

| | | | |
|---|---|---|---|
| 3,801,980 | 4/1974 | Danton et al. | 342/45 |
| 4,024,538 | 5/1977 | Bishop | 342/45 |
| 4,853,700 | 8/1989 | Funatsu et al. | 342/30 |
| 4,975,708 | 12/1990 | Stayton | 342/374 |
| 5,034,752 | 7/1991 | Pourailly et al. | 342/373 |
| 5,063,386 | 11/1991 | Bourdeau et al. | 342/40 |
| 5,072,224 | 12/1991 | Verbeke et al. | 342/152 |
| 5,196,856 | 3/1993 | Litchford et al. | 342/455 |

FOREIGN PATENT DOCUMENTS

| | | |
|---|---|---|
| 2059934 | 6/1971 | France . |
| 2455369 | 11/1980 | France . |
| 2135828A | 9/1984 | United Kingdom . |

*Primary Examiner*—John B. Sotomayor
*Attorney, Agent, or Firm*—Oblon, Spivak, McClelland, Maier & Neustadt

[57] ABSTRACT

This invention concerns a secondary radar antenna operating in S mode.

The antenna comprises a row of columns (1) of radiating elements powered by a hyperfrequency distribution circuit (2) containing a summing channel (Σ), a difference channel (Δ) and a secondary lobe suppression channel (Ω), each producing a radiation diagram. The antenna end columns (L, R) each produce at least one auxiliary radiation diagram offset with respect to the diagram produced by the summing channel and contributing with the other antenna columns (1) to the creation of the other three diagrams.

Application: secondary radars in S modes in communication with a large number of aircraft per antenna revolution.

11 Claims, 9 Drawing Sheets

SECONDARY RADAR ANTENNA OPERATING IN S MODE

BACKGROUND OF THE INVENTION

This invention concerns a secondary radar antenna working in S mode.

It is particularly applicable to S mode secondary radar systems in communication with a large number of aircraft per secondary antenna revolution.

The increase in air traffic requires that secondary radar send and receive more and more coded pulses. Within an area illuminated by antenna beams and containing an increasing number of aircraft, these coded pulses are chained to form longer and longer signals. The relative narrowness of the antenna beam, designed both for transmission and reception of coded pulses, limits the number of targets handled since the space illumination time considered necessary for transmission and reception of all these signals involved is too short.

S mode secondary radar antenna are generally single pulse and contain three channels carrying out three different antenna diagrams; the first channel is called the summing channel and is denoted Σ, the second channel is called the difference channel and is denoted Δ, and the third channel for the suppression of secondary lobes is usually called the SLS (Side Lobe Suppression) channel. In the reception phase, the summing channel is used mainly for reception of power in signals transmitted by aircraft and therefore to be able to detect the responses contained in these signals, and the difference channel is used particularly with the summing channel to form a signal used to determine aircraft offsets from the center line of the antenna, and therefore to precisely determine the azimuth of targets.

One solution for increasing the target illumination time is to widen the summing channel, Σ, antenna diagram. However since the peak transmitted power at constant average power, is low, the same is applicable for the range of the secondary radar. In particular, since the width of the main lobe of the summing channel, Σ, is imposed by international standards, this parameter cannot be varied.

Also, the fast appearance of parasite network lobes when offsetting the summing diagram prevents superimposition of scanning done by the summing diagram on antenna scanning.

Another solution would be to arrange several antennas in parallel so as to increase the illuminated space without reducing the radar range, but this solution is expensive and occupies a large volume.

SUMMARY OF THE INVENTION

The purpose of the invention is to correct the above disadvantages, particularly by adding at least one radiation diagram to enable an increase in the number of communications processed by a secondary radar per antenna revolution.

In this respect, the objective of the invention is a secondary radar operating in S mode containing a row of radiating element columns powered by a hyperfrequency distribution circuit containing a summing channel (Σ), a difference channel (Δ) and a secondary lobe suppression channel, each producing an illumination and a diagram associated with the antenna radiation, wherein the antenna end columns are powered by at least one auxiliary channel to produce an auxiliary radiation diagram and by another channel to contribute with the other antenna columns to the creation of the other three diagrams.

The main advantages of the invention are that it does not increase the size of the antenna, it is inexpensive, and is easy to implement.

BRIEF DESCRIPTION OF THE DRAWINGS

Other advantages and characteristics of the invention will become evident by reading the following description and referring to the drawings in the appendix which show.

DESCRIPTION OF THE INVENTION

Figure 1:
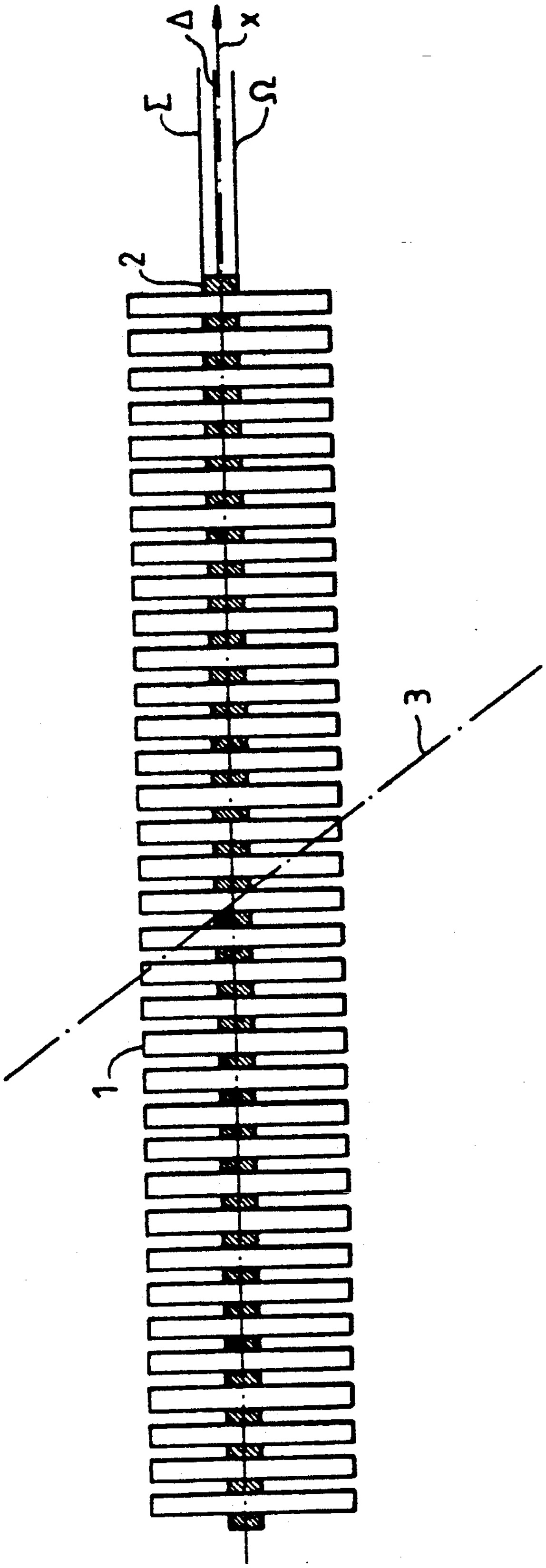
FIG. 1, a method of making the S mode secondary antenna.

FIG. 1 shows a method of making the S mode secondary radar. It consists of a row of columns (1) of radiating elements. For example, the antenna in FIG. 1 contains 35 columns. Each may contain, for example, about 10 radiating elements. A hyperfrequency distribution circuit (2) contains three hyperfrequency power supply channels, previously mentioned, the summing channel Σ, the difference channel Δ and the secondary lobe suppression channel denoted Ω on FIG. 1. Each of these channels powers all radiating elements in all columns (1). Couplers and phase shifters placed in the distribution circuit (2), using an architecture familiar to experts, can create known radiation diagrams for each of the three channels.

Figure 2:
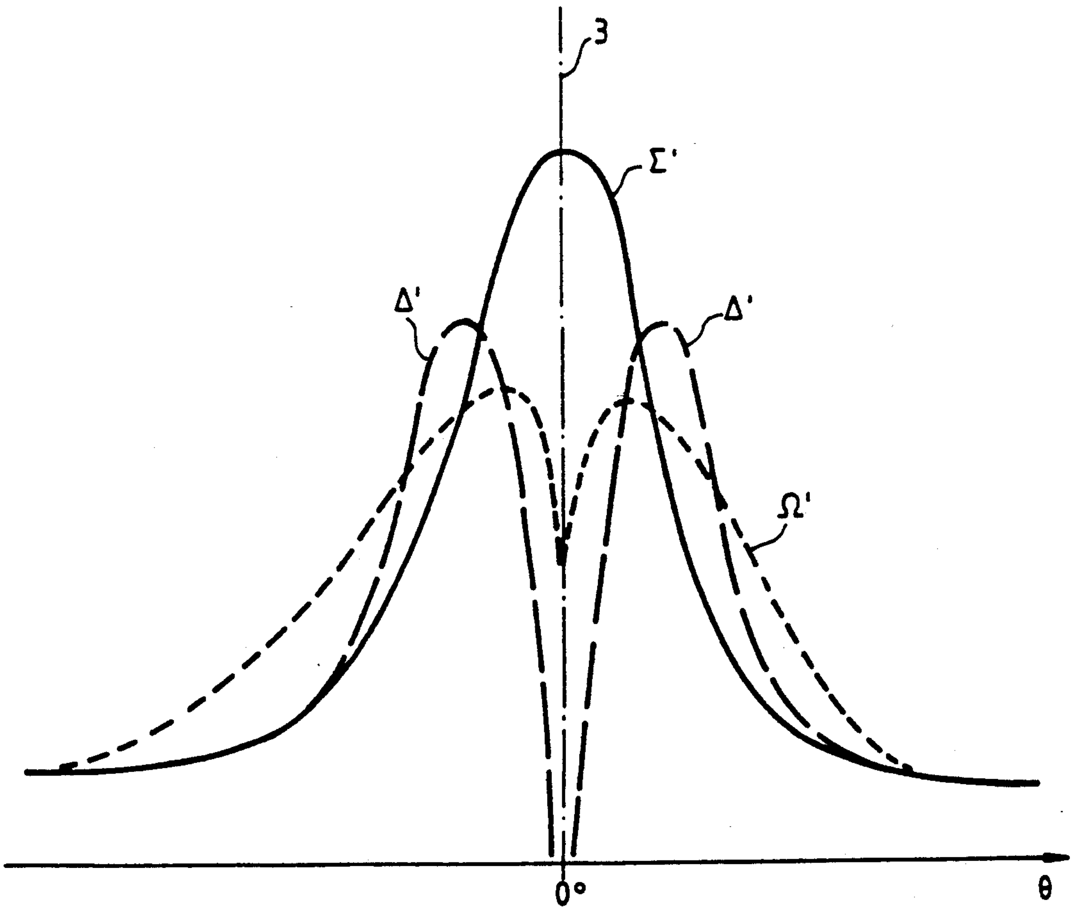
FIG. 2, radiation diagrams of an S mode secondary radar antenna.

FIG. 2 shows these Σ', Δ' and Ω' diagrams, giving the theoretical configuration of their gain as a function of the angle $\theta$ with respect to the antenna axis 3 where the angle $\theta$ is equal to 0°. Gains in the Σ', α', Ω' diagrams are symmetrical about this axis. The Σ' diagram powered by the summing channel, Σ, in the shape of an extended bell, is used for target detection, whereas the Δ' and Ω' diagrams powdered by the difference channel Δ and the secondary lobe suppression channel Ω respectively are used to define the position of targets. The diagrams, Σ', for the summing channel Σ is narrow, its width for a gain of less than 3 dB at maximum gain is only a few degrees. This narrowness restricts the maximum number of communications that can be handled per antenna rotation partly due to the fact that this diagram cannot be widened or offset sufficiently. Also, since hyperfrequency power supply circuits in the distribution circuit (2) are complex and since this distribution circuit is small, it is extremely difficult at reasonable cost to add an additional diagram powered by an additional channel incoming from the outside to the Σ', Δ', Ω′ diagrams mentioned above to, in addition to the other channels in the distribution circuit (2), and which would increase the antenna communication capabilities.

Figure 3:
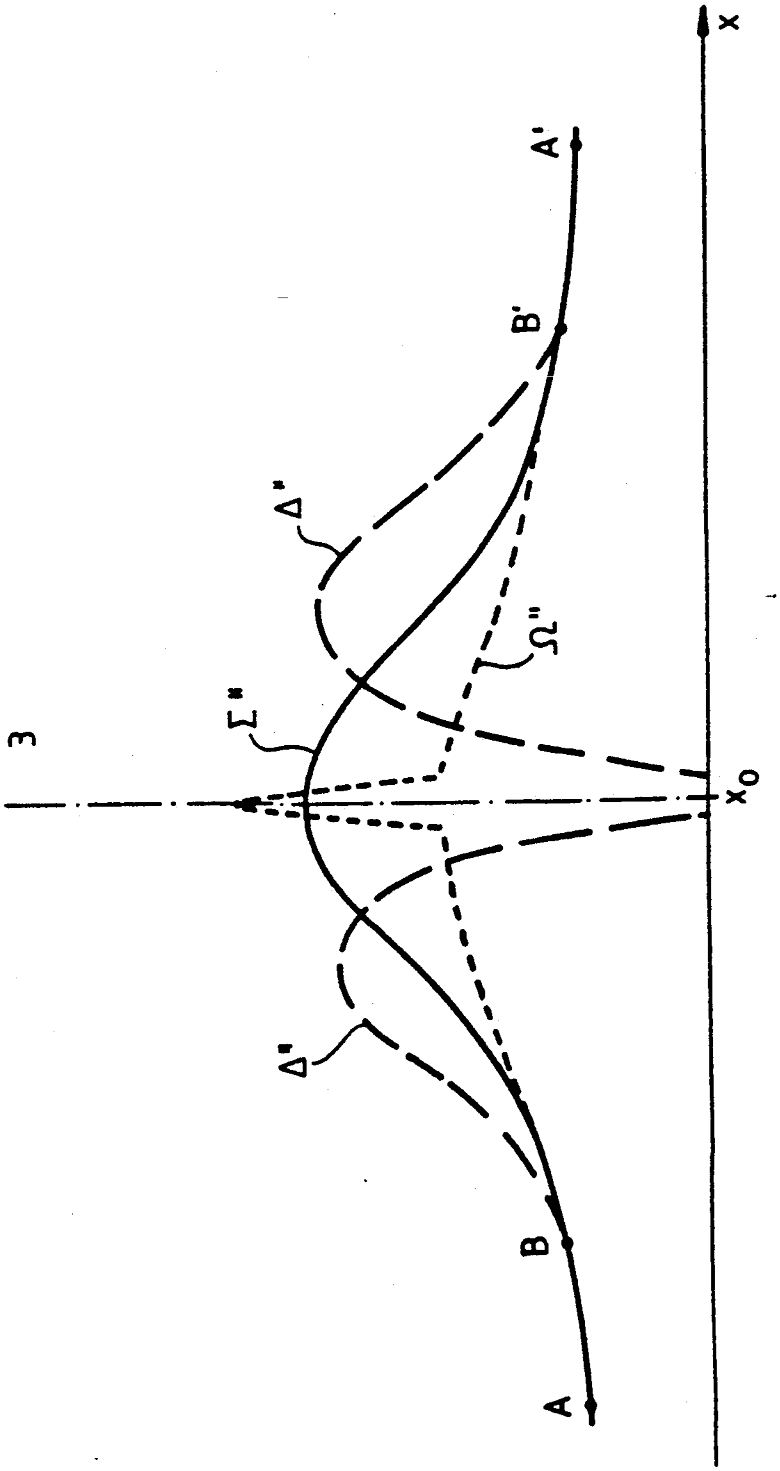
FIG. 3, illuminations of an S mode secondary radar antenna.

FIG. 3 shows illuminations Σ″, Δ″, Ω″ produced by the antenna in FIG. 1 as a function of an abscissa x shown on FIG. 1, taken in the plane of the antenna along the direction of its length and intersecting its axis (3). Whereas previous radiation diagrams are a function of the angle $\theta$ with respect to this axis (3), illuminations are shown as a function of the abscissa x. An initial illumination Σ″ is produced by the summing channel Σ, a second illumination Δ″ is produced by the difference channel Δ″ and a third illumination channel Ω″ is produced by the secondary lobe suppression channel Ω. These illuminations are symmetric with respect the antenna axis (3) passing through a point on the abscissa $x_0$ of the abscissa straight line x.

The shapes of these illuminations are known to experts. The radiation diagrams in FIG. 2 are obtained from the illuminations in FIG. 3 by Fourrier transformation in a conventional manner.

Figure 4:
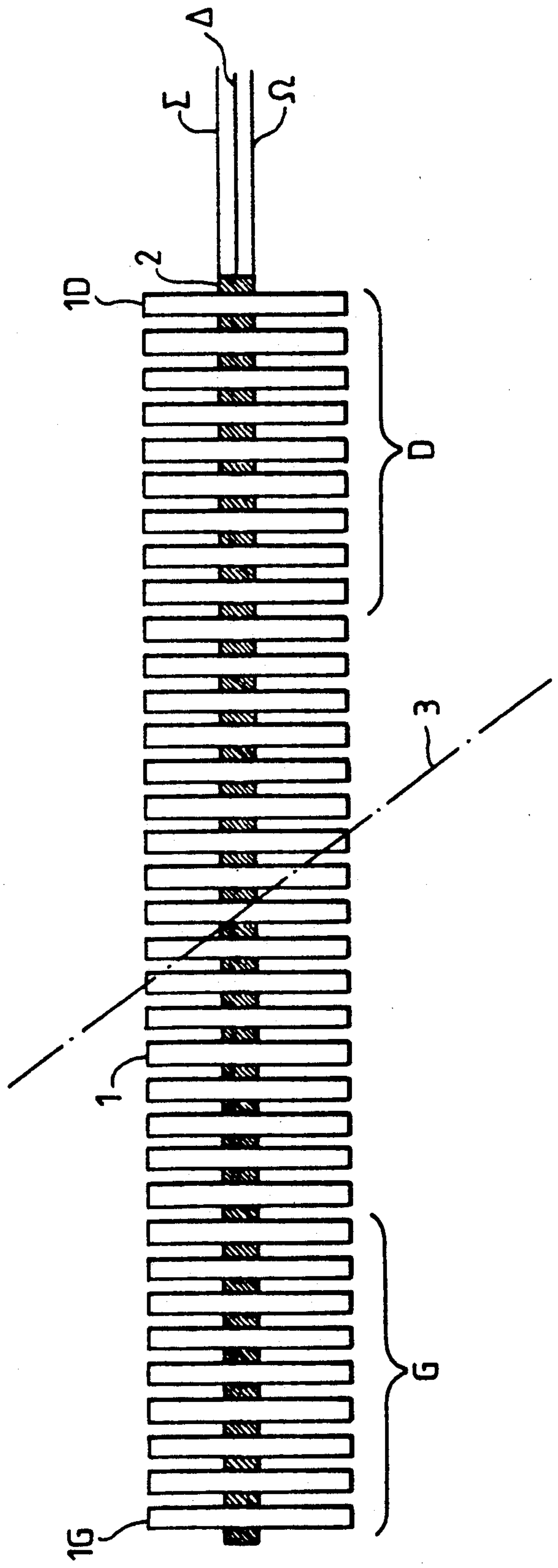
FIG. 4, groups of antenna radiating element columns for creation of the various diagrams.

The invention is based particularly on the fact that as distances from columns (1) to the center of the antenna or to its axis (3) increase, the various antenna illuminations Σ″, Δ″, Ω″ become more and more similar until they actually become identical for columns close to the ends or at the ends of the antenna as shown in FIG. 3, the distance of columns (1) from the axis (3) corresponding to the distance from the abscissa x to point $x_0$. Starting from each column located at the ends of the antenna, it is then possible to define a number of columns in which the 3 illuminations Σ″, Δ″, Ω″ are identical on the AB and A′B′ portions of each of these illuminations. These columns are shown on FIG. 4 by the L, R parentheses starting from column 1L at the extreme left of the antenna and from column 1R at the extreme right of the antenna. For example, 9 columns are thus used starting from each end of the antenna, but there may be more or less depending on the shape of the antenna diagrams for each of these columns. Preferably, exactly the same number of columns will be chosen at each end of the antenna. However the invention remains possible even if this is not the case, particularly if the number of columns at the left and right are similar.

According to the invention, these L and R end columns are powered, for example, by two channels, one channel making portions of the diagram AB, A′B′ common to the Σ″, Δ″, Ω″ illuminations made by the previous Σ, Δ, Ω channels, and at least on other channel making an auxiliary illumination giving, for example, an auxiliary diagram offset from the antenna axis (3). This offset, for example in bearing, may be obtained for example by making a phase gradient on the auxiliary illumination.

Figure 5:
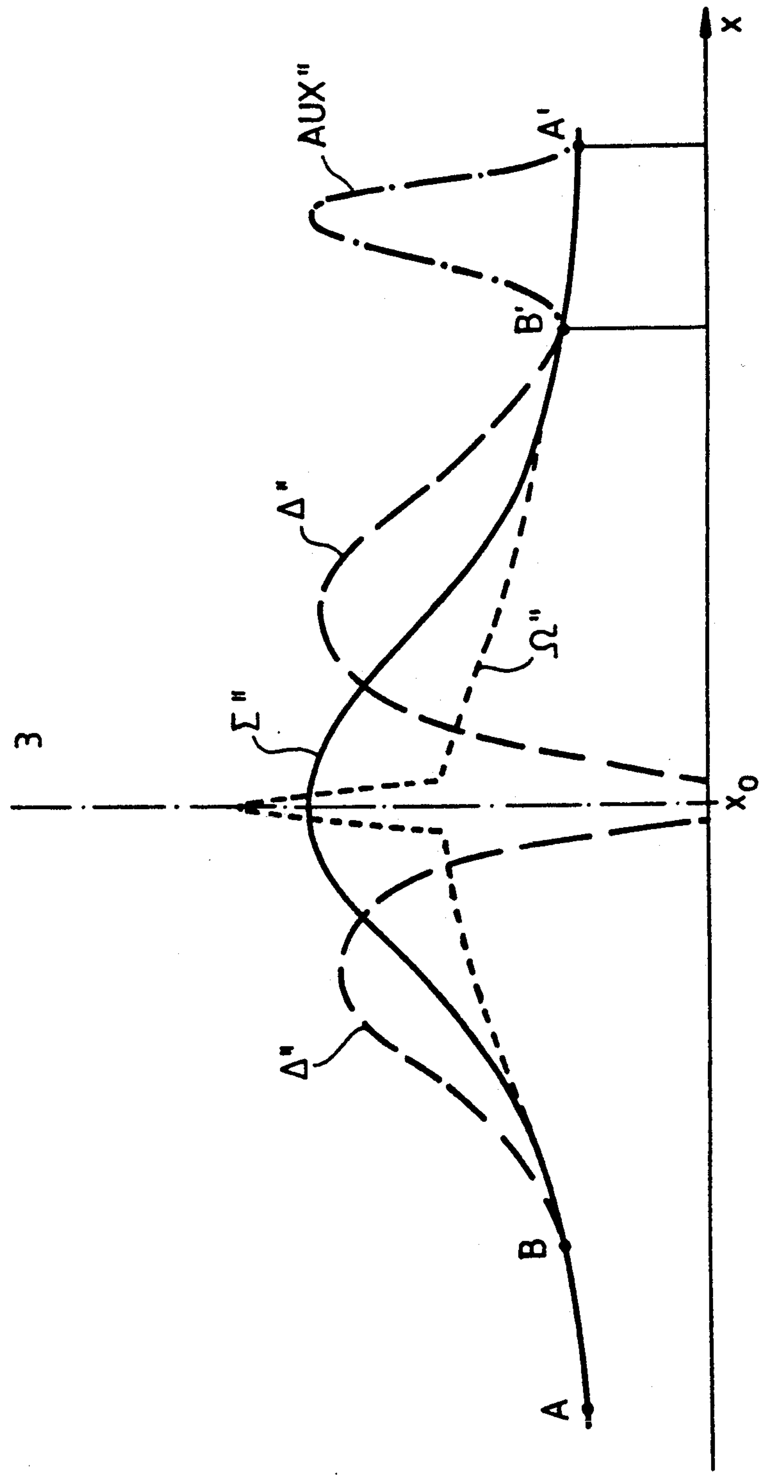
FIG. 5, auxiliary illumination created by the antenna according to the invention.

In FIG. 5, an auxiliary illumination AUX″ in the shape of a bell and the portions AB, A″B″ common to the other Σ″, Δ″, Ω″ diagrams, are made by the L, R columns at the antenna ends, the right columns R producing, for example, the auxiliary illumination AUX″. There are nine of these columns at each end in the example in FIG. 4, but this number may be different. The other central columns produce the Σ″, Δ″, Ω″ illumination parts between the two end portions AB, A″B″. In the case shown in FIG. 5, the auxiliary illumination AUX″ is made by the R columns at the extreme right of the antenna, but a second auxiliary illumination may also, for example, be made by the L columns at the extreme left of the antenna, either with an initial auxiliary illumination AUX″ or alone.

Figure 6:
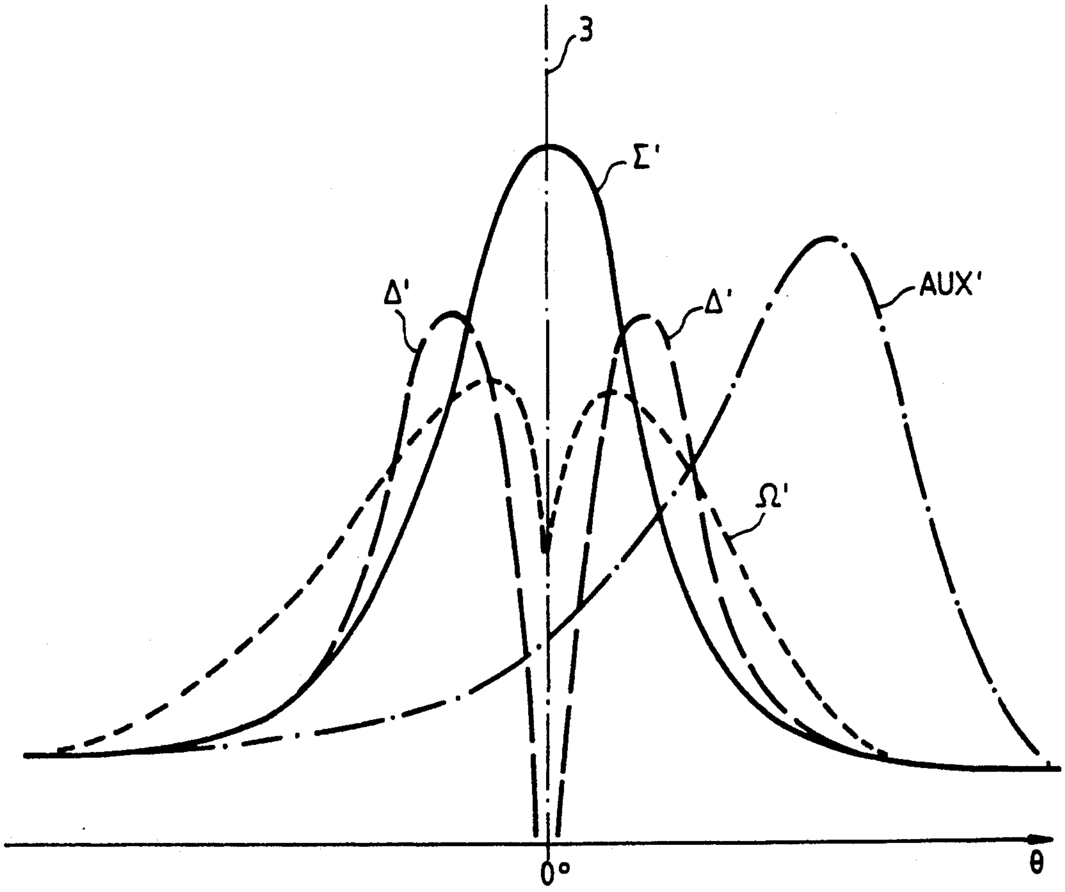
FIG. 6, diagram associated with the auxiliary illumination created by the antenna according to the invention.

FIG. 6 shows the auxiliary radiation diagram AUX′ associated with the auxiliary illumination AUX″.

This auxiliary diagram is used to complete scanning done by the Σ″ diagram for the summing channel Σ and therefore increases the antenna's communication capacity. The auxiliary diagram AUX′ has a lower maximum gain than the Σ′ diagram for the summing channel Σ since it is powered by less columns. For example, on an antenna such as that shown in FIGS. 1 and 3 containing 35 columns, the auxiliary diagram AUX″ is produced by 9 columns, or about a quarter of the antenna. Consequently, the maximum gain of the AUX′ auxiliary diagram(s) is approximately 6 dB less than the gain of the Σ′ diagram for the summing channel Σ. This reduced gain may make it more difficult to reach targets, however the auxiliary diagram(s) is or are only intended to supplement the main channel which is the summing channel Σ and are thus efficient when the targets approach the radar, at which time their gain becomes high enough for detection or communication.

Figure 7:
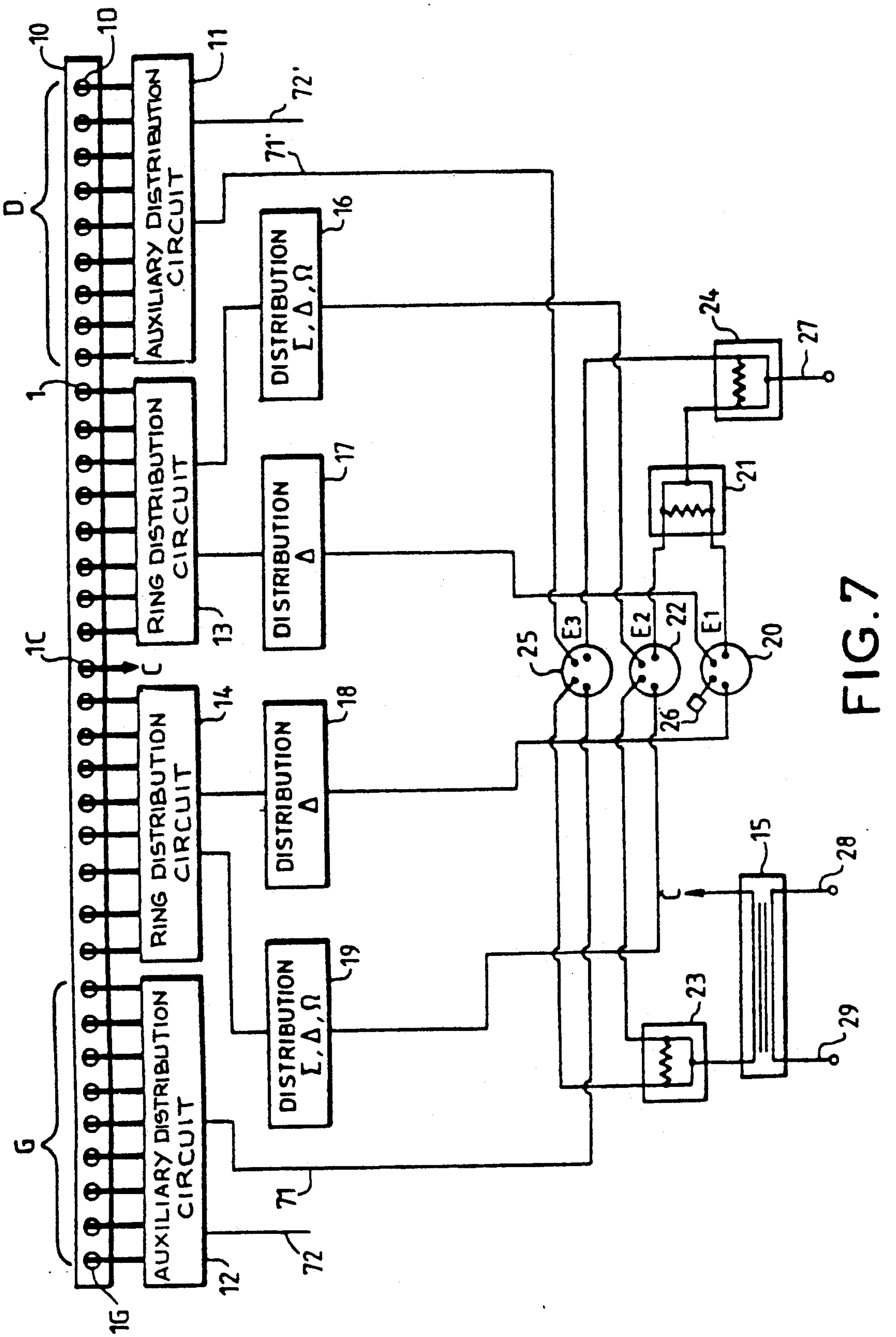
FIG. 7, an example of a possible method of making an antenna according to the invention.

FIG. 7 shows a possible method of making an antenna according to the invention. Radiating columns (1) are fixed together by a support (10). The antenna could include, for example, 35 columns (1). The end columns L and R are powered by auxiliary distribution circuits 11, 12, one circuit 11 being assigned to the right columns R, and another circuit, 12, being assigned to the left columns L. The other columns are powered, for example, by ring distribution circuits, 13, 14, the structure of which is familiar to the expert, one circuit 13 being assigned to columns to the right of the central column 1C, another circuit 14 being assigned to columns to the left of the central column 1C. The central column 1C crossing the antenna axis 3 is powered to make the summing Σ and the SLS Ω illumination. Amplitude distributions specific to summing and SLS illuminations between the central column (1C) and the other columns are made using, for example, a proximity coupler (15). The ring distribution circuit (13) on the right side is powered by a distribution circuit (16) common to the summing Σ, difference Δ, and SLS Ω channels, and by a distribution circuit (17) specifically assigned to the difference channel Δ. Similarly, the left side ring distribution circuit (14) is powered by distribution circuit (18) assigned to the difference channel Δ and by a distribution circuit (19) common to the summing Σ, difference Δ, and SLS Ω channels. Inputs to distribution circuits (17, 18) assigned to the difference channel Δ are connected to the first and third outputs of a first "ring" type coupler (20) respectively, these two outputs being out of phase by $\pi$. This makes it possible to create a phase difference of $\pi$ between the difference illumination Δ″ at the left of the central column (1C) and the difference illumination at the right. The second output from the first ring type coupler (20) is connected, for example, to a load (26) and its input I1 is connected, for example, to one of the outputs of a first "Wilkinson" type coupler (21). The inputs to distribution circuits 16, 19 assigned to summing, difference and SLS channels are connected to the first and third outputs of a second ring type coupler (22) respectively, the coupler input I2 being connected to the other output of the first "Wilkinson" type coupler (21), and its second output being connected, for example, to an output from a second "Wilkinson" type coupler (23). The input to the first "Wilkinson" type coupler (21) could, for example, be connected to the output of a third "Wilkinson" type coupler (24) the input of which forms an access (27). The other output of the third "Wilkinson" type coupler (24) is connected to input 13 of a third ring type coupler (25). The first and third output from this latter coupler are connected to the auxiliary distribution circuit inputs (11, 12) respectively, its second output being connected to the other output of the second "Wilkinson" type coupler (23). The input to this latter coupler, for example, will be connected to the output from a proximity coupler (15), the inputs of which (28, 29) form two other accesses. All distribution circuits and these couplers are contained in the distribution circuit (2), all links between these elements being hyperfrequency links. The coupling equipment 15, 20, 21, 22, 23, 24, 25 described above are given as an example, and other equipment performing the same functions could be used.

Auxiliary distribution circuits each have two accesses 71, 72, 71', 72', one access 72, 72' to a first channel providing part of the antenna illumination, common to the summing Σ", difference Δ" and secondary lobe suppression Ω" illuminations, and one access 71, 71" to a second channel providing the auxiliary illumination AUX". The antenna illumination generated by the first channel is located on the edges of this channel, and is common to the three above-mentioned Σ', Δ', Ω' diagrams. According to the invention, hyperfrequency power could be distributed on end columns L, R, through auxiliary distribution circuits (11, 12), for example, by using double access Blass matrices. Auxiliary distribution circuits may therefore contain this type of matrix. These Blass matrices make two orthogonal illuminations denoted, for example, $A_n$, and $C_n$, where $A_n$ is the illumination common to the summing Σ, difference Δ and secondary lobe suppression Ω channels on the edges of the antenna, in other words at the L, R end columns making the auxiliary diagram. The illumination denoted $B_n$, corresponding to the auxiliary diagram, can then be obtained from the previous orthogonal illuminations $A_n$ and $C_n$ by the following relation:

$$(B_n = K_1 A_n + K_2 C_n) \quad (1)$$

where $K_1$ and $K_2$ are, for example, factors defining the coupler transfer function and satisfying the following relation:

$$(K_1^2 + K_2^2 = 1) \quad (2)$$

If the diagram associated with the illumination $B_n$ is offset from the antenna axis 3, illumination $B_n$ then becomes almost orthogonal to illumination An, consequently $K_1$ becomes very small compared with $K_2$ and $B_n$ becomes the same as $C_n$. Simulations and experimental tests carried out by the Submitter have shown that a sufficient offset to reach this orthogonality between illuminations $A_n$ and $B_n$ associated with a difference in the spacing between the L and R end columns forming the auxiliary illumination and the spacing between the other columns (for example if this spacing is reduced) does not cause parasite illuminations particularly of network lobes. It is then possible to use the Blass matrices in auxiliary distribution circuits to obtain an auxiliary diagram offset from the center line of the antenna without parasite network lobes.

Figure 8:
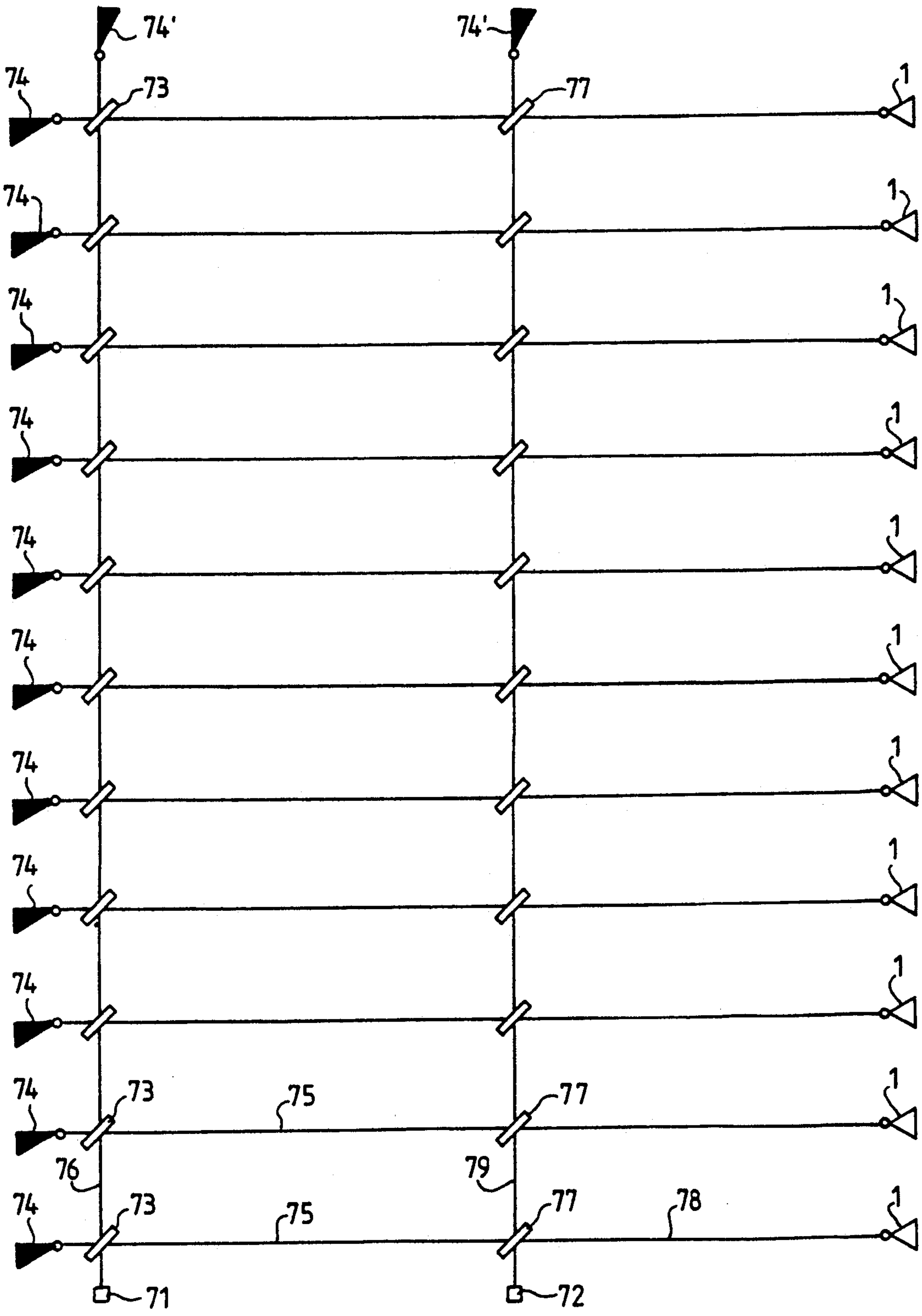
FIG. 8, an example of a Blass matrix used to produce antenna illumination according to the invention.

FIG. 8 shows a possible method of making a Blass matrix with two accesses (71, 72) to obtain the illuminations $A_n$ and $B_n$ described above, in other words illumination AB, A'B' common to the Σ, Δ, Ω channels on the edges of the antenna and the auxiliary illumination. For example, the Blass matrix shown on FIG. 7 is contained in at least one of the auxiliary distribution circuits (11, 12). Its structure is familiar to the expert. It contains two accesses (71, 72). For example, one access (71) may be connected to an output from the third ring type coupler (25) to form the illumination part $A_n$ common to the summing Σ, difference Δ and SLS Ω illuminations. It powers columns (1) of radiating elements on one side of the antenna, and for example, there could be 11 of these columns. The spacing between these L, R end columns is, for example, less than the spacing between the other antenna columns. For example, a first access (71), powers the first channel providing illumination $A_n$ of antenna end columns (1), and the other access (72) powering the second channel providing auxiliary illumination $B_n$. The position of these two channels could be reversed. For example, there are 11 columns (1) powered by the Blass matrix in FIG. 7. However, for example, this increase relative to the initial number of end columns of 9 may be the result of changing the spacing between these columns, and particularly of reducing this spacing.

For example, one basic pattern of the Blass matrix includes a coupler (73) connected through a hyperfrequency line (75) to a hyperfrequency load (74) and to coupler (73) in the next pattern through a hyperfrequency line (76), coupler (73) for the first pattern being connected to the access (71), the coupler for the latter pattern being connected to an additional hyperfrequency load (74') opposed to the first access (71). The first channel basic patterns are connected to the second channel patterns through couplers (77), for example of the same type as the previous couplers. Each of these couplers (77) is connected to a column (1) of radiating elements through a hyperfrequency line (79) and are interconnected to each other through hyperfrequency lines (79), the coupler for the first pattern being connected to the second access (72), and the coupler for the last pattern to a hyperfrequency load (74'). Length and dimensions of the hyperfrequency lines 75, 76, 78 and 79 are determined using methods known to experts, the technology of the distribution circuit (2) may be, for example, air triple board, particularly to minimize losses. Couplers (73, 77) could, for example, be of the Echelle type. These couplers may be of the same type but not identical. For example, the lengths of hyperfrequency lines are different.

According to the invention, it is possible to make an offset auxiliary diagram created by the auxiliary illumination produced by the L, R, end columns using the same spacing as for the antenna central columns. However in this case parasites network lobes will appear. These can be suppressed preferably by doing a small offset of the auxiliary diagram, but this small offset combined with the use of the Blass matrix as described in FIG. 8 creates a deformation of the main lobe of the auxiliary diagram. Since the auxiliary diagram is slightly offset, its illumination $B_n$ is no longer orthogonal to the illumination $A_n$ of the summing diagram Σ' and therefore, in relation (1) mentioned above, illumination $B_n$ is no longer coincident with illumination $C_n$ done by the Blass matrix. In this case, in order to prevent deformation of the main lobe of the auxiliary diagram, it would be possible, for example, to place a switch at the Blass matrix input as shown in FIG. 8. For example, it would also be possible to combine this switch with a change to the spacing of the antenna L, R end columns.

Figure 9:
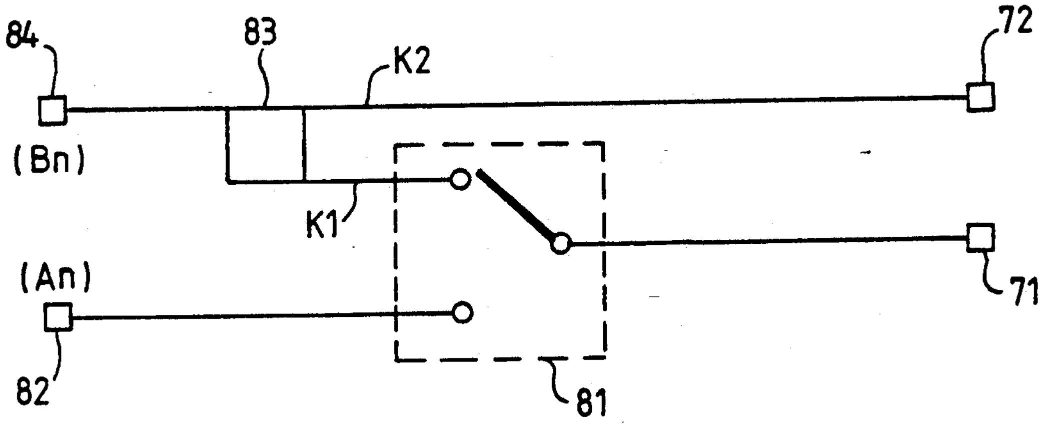
FIG. 9, an example of possible wiring for a switch used in the antenna according to the invention.

FIG. 9 shows a possible example of the wiring for these switches. The first output from a switch (81), is connected to a second access (82) to the Blass matrix in order to make the illumination $A_n$, whereas its second output is connected to the first input of a coupler (83), the output of which is connected to a second access (84) of the matrix to make illumination $B_n$, the coupler having a transfer function equal to the coefficient $K_1$ between its first input and its output, $K_1$ being the coefficient in relation (1). For example, the switch (81) input is connected to the first access (71) shown in the construction method in FIG. 7. Depending on its position, switch 81 connects its first output to its input or its second output to its input. The second input to coupler (83) is connected to the second access (72), for example, shown on FIG. 7. Its transfer function between its first input and output is equal to the coefficient $K_2$ in relation (1). FIG. 9 shows the position of the switch such that the illumination $B_n$ is made, with $B_n$ then being equal to $K_1A_n+K_2C_n$ according to relation (1). One of the illuminations is done depending on the position of switch (81).

The antenna end columns (L, R) chosen to make the auxiliary radiation diagram will preferably be those that correspond to the common part of the illumination between the summing Σ, difference Δ and SLS Ω channels. However, for example, they could extend to more central columns where this identity is no longer fully satisfied, particularly in order to increase the gain of the auxiliary diagram.

It is also possible, for example, to add some antenna end columns powered only in order to make the auxiliary diagram, again particularly in order to increase the gain of the auxiliary diagram.

We claim:

1. Secondary radar antenna operating in S mode comprising a row of columns (1) of radiating elements powered by a hyperfrequency distribution circuit (2) containing a summing channel (Σ), a difference channel (Δ), and a secondary lobe suppression channel (Ω), each producing an illumination (Σ'', Δ'', Ω'') and an associated radiation diagram (Σ', Δ', Ω'), wherein the L and R antenna end columns are powered by at least one auxiliary channel to produce at least one auxiliary radiation diagram (AUX') and by another channel to contribute with the other antenna columns (1) in creating three other diagrams (Σ', Δ', Ω').

2. Antenna according to claim 1, wherein the auxiliary radiation diagram (AUX') is offset with respect to the diagram (Σ') produced by the summing channel (Σ).

3. Antenna according to claim 1, wherein the end columns (L, R) producing the auxiliary radiation diagram (AUX') are chosen from those in which the illuminations (Σ'', Δ'', Ω'') of the summing (Σ), difference (Δ) and secondary lobe suppression (Ω) channels are practically identical.

4. Antenna according to claim 1, wherein the spacing between the end columns (L, R) producing the auxiliary radiation diagram is not the same as the spacing between the other columns (1).

5. Antenna according to claim 4, wherein the spacing between the end columns (L, R) is less than the spacing between the other columns (1).

6. Antenna according to claim 1, wherein the power supply channels for the end columns (L, R) are obtained from the summing (Σ), difference (Δ) and secondary lobe suppression (Ω) channels by means of a Blass matrix (71, 72, 73, 74, 75, 76, 77, 78, 79).

7. Antenna according to claim 1, wherein the hyperfrequency distribution circuit (2) contains at least:

a first auxiliary distribution circuit (11) powering the antenna right end columns (R) connected by coupling equipment (15, 20, 21, 22, 23, 24, 25) to the inputs of the hyperfrequency distribution circuit (2);

a second auxiliary distribution circuit (12) powering the antenna left end columns (L) connected by coupling equipment to the inputs of the hyperfrequency distribution circuit (2);

a first ring distribution circuit (13) powering columns (1) located between the antenna central column (1C) and the right end columns (R), connected to a first distribution circuit (16) common to the summing (Σ), difference (Δ) and secondary lobe suppression (Ω) channels, and to a first distribution circuit (17) assigned to the difference (Δ) channel, with the latter two distribution circuits being connected through coupling equipment to the inputs of the hyperfrequency distribution circuit (2);

a second ring distribution circuit (14) powering columns (1) located between the antenna central column (1C) and the antenna left end elements (L) connected to a second distribution circuit (19) common to the summing (Σ), difference (Δ) and secondary lobe suppression (Ω) channels, and to a second distribution circuit (18) assigned to the difference channel, these latter two distribution circuits being connected by coupling equipment to the inputs of the hyperfrequency distribution circuit (2), with the central column (1C) being connected by coupling equipment to an input.

8. Antenna according to claim 7, wherein the auxiliary distribution circuits (11, 12) each contain a Blass matrix.

9. Antenna according to claim 7, wherein each coupling equipment contains ring couplers (20, 22, 25).

10. Antenna according to claim 7, wherein each coupling equipment contains "Wilkinson" type couplers (21, 23, 24).

11. Antenna according to claim 1, wherein the power supply channels (82, 84) for end columns (L, R) producing the auxiliary radiation are separated by a switch (81).

* * * * *